United States Patent [19]

Matsuda et al.

[11] 3,742,153

[45] June 26, 1973

[54] TELEPHONE CIRCUIT FOR SIDETONE BALANCE AND AUTOMATIC TRANSMISSION LEVEL ADJUSTMENT

[75] Inventors: Ryoichi Matsuda, Musashino; Masaaki Terai, Hoya; Yasuo Hojyo, Sayama, all of Japan

[73] Assignee: Nippon Telegraph and Telephone Public Corporation, Tokyo, Japan

[22] Filed: June 29, 1971

[21] Appl. No.: 157,985

[30] Foreign Application Priority Data

Sept. 3, 1970 Japan ............................. 45/76677

[52] U.S. Cl. ........................ 179/81 A, 179/170 NC

[51] Int. Cl. ........................................ H04m 1/58

[58] Field of Search ................... 179/81 A, 170 NC

[56] References Cited

UNITED STATES PATENTS

| | | | |
|---|---|---|---|
| 3,546,395 | 12/1970 | Schutl | 179/81 A |
| 3,582,564 | 6/1971 | Knauer | 179/81 A |
| 3,170,043 | 2/1965 | Hohmann | 179/81 A |
| 3,597,550 | 8/1971 | Sternbeck | 179/81 A |
| 3,227,812 | 1/1966 | Schlichte | 179/81 A |
| 2,818,470 | 12/1957 | Busala | 179/81 A |

*Primary Examiner*—Kathleen H. Claffy
*Assistant Examiner*—Alan Faber
*Attorney*—Chittick, Pfund, Samuels & Gauthier

[57] ABSTRACT

In a telephone circuit comprising a telephone line, transmitting and receiving means connected to the telephone line, there are provided amplifier means constructed to produce a current which is proportional to the input voltage but not related to the load and connected between the telephone line and the receiving means, the amplifier means being connected in parallel with the transmitting means, a first variable impedance element connected in parallel with the transmitting means, and second variable impedance element connected in parallel with the receiving means, the first and second variable impedance elements varying in accordance with the DC voltage condition of the telephone line.

9 Claims, 4 Drawing Figures

INVENTORS

RYOICHI MATSUDA
MASAAKI TERAI
YASUO HOJYO

BY Chittick, Pfund, Birch, Samuels & Gauthier
ATTORNEYS

INVENTORS
RYOICHI MATSUDA
MASAAKI TERAI
YASUO HOJYO
BY Chittick, Pfund, Birch, Samuels & Gauthier
ATTORNEYS

TELEPHONE CIRCUIT FOR SIDETONE BALANCE AND AUTOMATIC TRANSMISSION LEVEL ADJUSTMENT

BACKGROUND OF THE INVENTION

This invention relates to a telephone circuit and more particularly to an anti-sidetone telephone circuit not utilizing a hybrid transformer and which is suitable to be fabricated as an integrated circuit. The novel telephone circuit utilizing active elements can automatically and satisfactorily suppress the sidetone and provide an adequate level of speech independent of the length of the telephone line to which the telephone circuit is connected.

The anti-sidetone circuit now being widely used in coventional telephone sets comprises a hybrid coil or transformer connected and arranged so as to prevent two sets of terminal pairs from being mutually coupled electrically. With such an anti-sidetone circuit, even when the hybrid coil is ideal, attenuations of 3dB are unavoidable for both transmission and reception of the speech. Moreover, from the standpoint of economy, since the hybrid coils actually used in commercial telephone sets are rather simple, the attenuation of the transmitted and received speeches is generally larger than 3dB.

Although the hybrid coil or transformer is advantageous from the standpoint of durability and simplicity because it is comprised by a magnetic core and coils, it increases the physical dimension and weight of the telephone set, especially of the dial-in handset type.

Furthermore, in the conventional telephone circuit, in order to prevent excessively large transmitting and receiving levels caused by a short length of the subscriber's line, the extent of attenuation is adjusted manually. Such a manual adjustment, however, is troublesome so that it is highly desirable to provide efficient means capable of automatically adjusting the transmitting and receiving levels in accordance with the line loss.

To eliminate the above described defects of the hybrid transformer, a new type of an anti-sidetone circuit not utilizing the hybrid transformer has recently been proposed. Thus, for example, U.S. Pat. No. 3,440,367 discloses a combination of a resistance Wheatstone bridge and an amplifier, U.S. Pat. No. 3,227,812 discloses an arrangement wherein a portion of the transmission output appearing across the transmission terminals is applied through an amplifier to the receiving side with the opposite phase for preventing the sidetone and U.S. Pat. No. 3,180,047 discloses an arrangement wherein the transmission output is applied to a pair of amplifiers of the opposite phase and the outputs from the amplifiers are combined in the receiver for suppressing the sidetone. Another approach involves an arrangement by which a transistor is included in an anti-sidetone circuit and the receiver is connected across two points between which the receiver outputs appear at the same phase.

However, these arrangements are not advantageous on the following grounds. More particularly, with a simple circuit arrangement, the attenuation of the transmitted and received speeches is increased but the decrease in the attenuation can be attained only with complicated circuit construction. Where the transmitter is energized from a central office battery the operating points of the active elements vary greatly for different lengths of the line thus resulting in the distortion of the speech as well as the variation of the gain. On the other hand, if the circuit is constructed to have a constant DC operating point, the non-linear elements included in the circuit become difficult to operate thus affecting the operation of the automatic level control. Moreover, as the operation of the circuit is largely influenced by the difference in the operating characteristics of the elements it becomes difficult to fabricate the circuit with integrated circuit elements. For this reason, such a design is not applicable to telephone circuits.

SUMMARY OF THE INVENTION

It is therefore an object of this invention to provide a novel telephone circuit utilizing active elements, which is simple in circuit construction and can greatly decrease the attenuation of the transmitting and receiving levels.

Another object of this invention is to provide an improved telephone circuit provided with a power supply circuit which can always maintain a constant DC condition in the telephone circuit and does not affect in any way the AC condition thereof thus effectively preventing the distortion of the speech as well as the variation in the gain caused by the difference in the length of the subscriber's line.

Still another object of this invention is to provide a novel telephone circuit wherein elements which vary their impedances according to the DC voltage appearing across input terminals of a telephone set are associated with both transmitter and receiver, thereby always maintaining automatically the transmitting and receiving levels at a proper level.

A further object of this invention is to provide an improved telephone circuit of small size and light weight by fabricating the circuit with component elements that can be fabricated into an integrated circuit excepting the transmitter, receiver and condensers.

According to this invention there is provided a telephone circuit comprising a telephone line, transmitting means and receiving means connected to the telephone line, characterized in that amplifier means constructed to produce a current which is proportional to the input voltage but not related to the load is connected between the telephone line and the receiving means, that the transmitting means is connected in parallel with the amplifier means, that a first variable impedance element is connected in parallel with the transmitting means and that a second variable impedance element is connected in parallel with the receiving means, the first and second variable impedance elements varying their impedances in accordance with the DC voltage condition of the telephone line.

In a preferred embodiment of the invention the first and second variable impedance elements take the form of field effect transistors.

BRIEF DESCRIPTION OF THE DRAWINGS

Further objects and advantages of the invention together with the organization and operation thereof can be more fully understood from the following detailed description taken in conjunction with the accompanying drawings in which.

DESCRIPTION OF THE PREFERRED EMBODIMENTS

Figure 1:
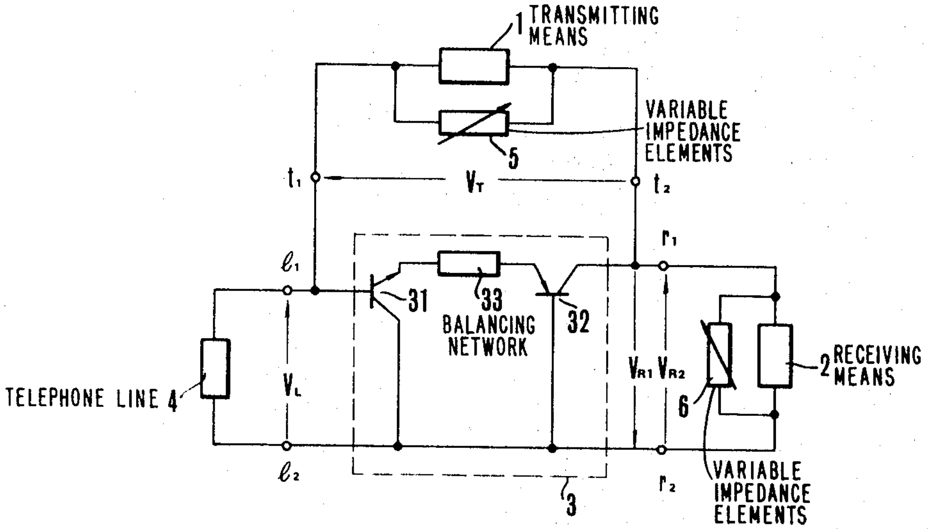
FIG. 1 is a circuit diagram to explain the principle of the novel telephone circuit.

With reference first to FIG. 1 of the accompanying drawing, the novel telephone circuit shown therein comprises a EMBODIMENTS 1, receiving means 2, an amplifier 3, and variable impedance elements 5 and 6 which vary their impedances in accordance with the magnitude of the DC voltage across a telephone line 4. Amplifier 3 comprises a four terminal network including a pair of transistors 31 and 32 and a balancing network 33 connected between the emitter electrodes of these transistors. The telephone line 4 is connected to terminals $l_1$ and $l_2$ of the amplifier 3 while across another terminals $r_1$ and $r_2$ is connected the receiving means 2 which is connected in parallel with variable impedance element 6. Terminals $t_1$ and $t_2$ of transmitting means are connected to terminals $l_1$ and $r_1$, respectively, of the amplifier 3. The variable impedance element 5 is connected in parallel with transmitting means 1.

In the circuit described above, let T, R, N and L represent respectively internal impedances of the transmitting means 1, receiving means 2, balancing network 33 and telephone line 4 and $V_T$, $V_L$, $V_{R1}$ and $V_{R2}$ represent the voltage across respective terminals shown in FIG. 1. It is now assumed that variable impedance elements 5 and 6 are not used and that amplifier 3 is disconnected from the circuit, in other words, that the telephone circuit comprises only the transmitting and receiving means 1 and 2. Then, as shown by the following equation the transmission signal voltage $V_T$ generated by the transmitting means 1 is divided into the voltage $V_{R1}$ across terminals $r_1$ and $r_2$ and the voltage $V_L$ across terminals $l_1$ and $l_2$, which are applied line 4, respectively.

$$V_{R1} = L/R + L\ V_T \tag{1}$$

$$V_L = L/R + L\ V_T \tag{2}$$

When the amplifier 3 is connected in the circuit as shown in FIG. 1, a voltage $V_{R2}$ is fed back across the receiving means 2 by the voltage $V_L$ appearing across the telephone line 4. More specifically, the input voltage $V_L$ impressed upon the collector grounded transistor 31 comprising the input stage of amplifier 3 appears at the same phase on the emitter electrode of transistor 31 and is converted into a current $i_R$ expressed the following equation (3) by the action of a base grounded transistor 32 acting as the output stage of amplifier 3, and impedance $N$ of the balancing network 33 connected to the emitter electrode of the transistor 32, and the current $i_R$ is then supplied to the receiving means 2.

$$i_R = 1/N \cdot V_L = L/R + L \cdot 1/N \cdot V_I \tag{3}$$

The voltage drop created by current $i_R$ across the receiving means 2 is expressed by the following equation and has a phase opposite to that of the voltage $V_{R1}$ $$V_{R2} = i_R \cdot R = L/R + L \cdot R/N\ V_T \tag{4}$$

Thus, a sidetone voltage $V_S$ given by equation 5 is applied across the receiving means 2 by the transmission signal voltage $V_T$ $$V_S = V_{R1} - V_{R2} = R/R + L\ (1 - L/N)\ V_T \tag{5}$$

Equation 5 shows that when the impedance $N$ of the balancing network 33 is made equal to the impedance $L$ of the telephone line 4 ( or $N = L$ ) the sidetone voltage $V_S$ is reduced to zero, thus completely eliminating the sidetone.

Under this condition wherein the sidetone is balanced out the transmission voltage generated by transmitting means 1 does not form any voltage drop across terminals $r_1$ and $r_2$ of the receiving means 2, the voltage appearing across terminals $l_1$ and $l_2$ of telephone line 4 being equal to $V_T$. Thus, the voltage across terminals $t_1$ and $t_2$ is transmitted to the telephone line without being divided by another circuit components whereby the efficiency of the speech is improved greatly when compared with the conventional telephone circuit. Furthermore, as the speech voltage transmitted over the telephone line 4 is applied not only to receiving means 2 through transmitting means 1 but also to the receiving means 2 with the same phase through amplifier 3 so that the efficiency of the received speech is sufficiently improved over the conventional telephone circuit. Describing this in more detail, under the above described balanced condition of the sidetone, the attenuation $b_T$ of the power from the transmitting means 1 to the telephone line 4 and the attenuation $b_R$ of the power from the telephone line 4 to the receiving means 2 are expressed by the following equations.

$$b_T = 20 \log |T + L/2\ \sqrt{TL}\ | \text{ (dB)} \tag{6}$$

$$b_R = 20 \log |1/2 \cdot \sqrt{R/L}| \text{ (dB)} \tag{7}$$

Thus, when the impedances of the transmitting and receiving means are selected to have suitable values it is possible to decrease the power attenuations $b_T$ and $b_R$ to sufficiently small values. Thus, for example, where $T = R = 300$ ohms and $L = 600$ ohms, equations 6 and 7 give $b_T = 0.5$ dB and $b_R = -3.0$ dB which are much smaller than the attenuations of $b_T = b_R \approx 4 \sim 6$dB in the case of the telephone circuit utilizing the conventional hybrid transformer.

With reference now to the variable impedance elements 5 and 6 shown in FIG. 1, these elements have such characteristics as to decrease their impedances as the DC voltaage across terminals $l_1$ and $l_2$ of the telephone line increases. Consequently, at a telephone set near a telephone office as the DC voltage across terminals $l_1$ and $l_2$ is high, transmitting and receiving means 1 and 2 are shunted by variable impedance elements 5 and 6 respectively which manifest low impedances under these conditions whereby the volumes of the transmission and received speeches which otherwith tend to become excessive are automatically adjusted to proper levels. Such variable impedance elements can be provided by connecting the source and drain electrodes of field effect transistors respectively across the output terminals of transmitting means 1 and across the input terminals of the receiving means and by connecting the gate electrodes of the transistors to terminal $l_1$ of the telephone line. It is necessary to prevent applying DC voltage across the drain and source electrodes of the field effect transistors.

Figure 2:
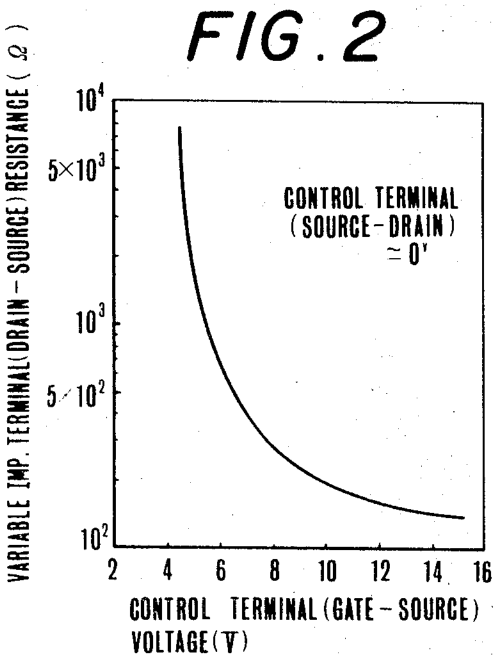
FIG. 2 is a plot of a characteristic curve of a variable impedance element employed in this invention

FIG. 2 shows the variable impedance characteristic of a field effect transistor wherein the ordinate represents the resistance between the drain and source electrodes while the abscissa the voltage across the gate and source electrodes. When the field effect transistor is used as a variable impedance element it is possible to fabricate it as an integrated circuit together with another circuit elements.

Figure 3:
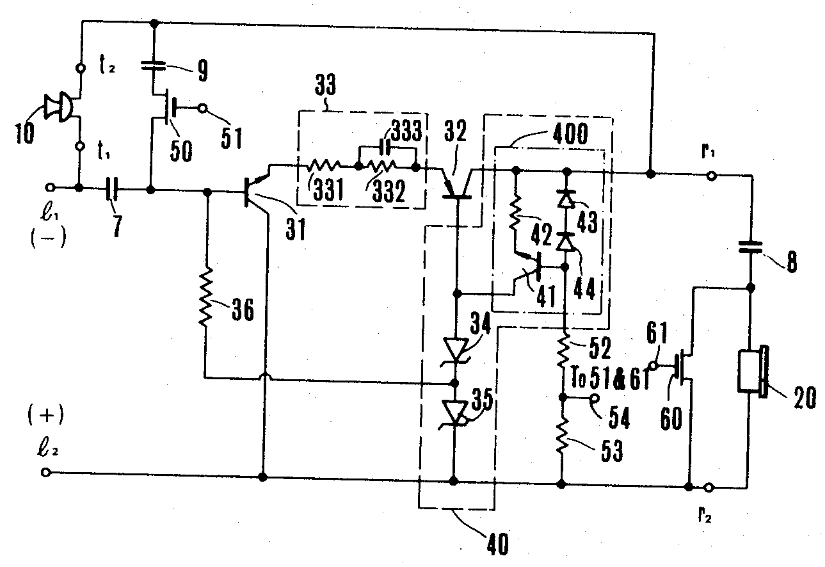
FIG. 3 is a connection diagram of one embodiment of the novel telephone circuit and FIG. 4 shows a modified power supply circuit employed in this invention.

FIG. 3 shows a connection diagram of one example of a telephone circuit embodying the invention and comprising transmitting means in the form of a carbon transmitter 10, receiving means in the form of an electromagnetic receiver 20 and variable impedance elements in the form of field effect transistors 50 and 60. A coupling capacitor 7 connected between a telephone line and an amplifier and a DC blocking capacitor 8 is connected in series with receiver 20. The field effect transistor 50 is provided with a DC blocking capacitor 9. Serially connected Zener diodes 34 and 35 are connected to the base electrode of transistor 32 of the amplifier and the common juncture between these diodes is connected to the base electrode of transistor 31 through a resistor 36. The balancing network 33 of the amplifier comprises a pair of serially connected resistors 331 and 332 and a capacitor in parallel with resistor 332. The juncture between the base electrode of transistor 32 and Zener diode 34 is connected to the collector electrode of a transistor 41 whereas the emitter electrode thereof is connected to the collector electrode of transistor 32. Diodes 43 and 44 are connected in series across the base electrode of transistor 41 and terminal $r_1$. Further, the base electrode of transistor 41 is connected to the other terminal $r_2$ via two resistors 52 and 53 connected in series. Terminal 54 connected to the juncture between resistors 52 and 53 is connected to the gate electrodes 51 and 61 of the field effect transistors 50 and 60, respectively.

In this telephone circuit, the DC bias for the amplifier is applied from a DC source (not shown) of a telephone office through transmitter 1, a constant current circuit 400 comprising transistor 41, resistor 42 and diodes 43 and 44, and a DC supply circuit 40 including Zener diodes 34 and 35, the circuit 40 acting to bias transistors 31 and 32 of the amplifier through resistor 36.

As is well known in the art, the sensitivity of a carbon transmitter varies dependent upon the DC bias current. In the telephone circuit utilizing an ordinary hybrid transformer the DC bias current of the carbon transmitter varies in proportion to the terminal voltage across the telephone line. As a consequence, the sensitivity of the carbon transmitter varies in accordance with the length of the telephone line measured from the telephone office. However, in accordance with this invention the DC bias current for the carbon transmitter 10 is maintained at a substantially constant value by the action of the constant current circuit 400 described above. For this reason, the sensitivity of the transmitter does not vary dependence upon the length of the telephone line whereby the output level of the transmitted signal is maintained at a substantially constant value irrespective of the length of the telephone line. In addition, according to the invention, the received signal transmitted over the telephone line is impressed upon receiver 20 over two routes, one through transmitter 10 and the other through amplifier 3. However, the received signal is supplied to the receiver with the same phase through said two routes so that the transmission efficiency of the received speech is much higher than that of the conventional telephone circuit. The purpose of resistors 52 and 53 is to supply a control voltage proportional to the variation in the line voltage to the gate electrodes of the field effect transistors through terminal 51. Furthermore, according to this invention as it is possible to fabricate various elements excepting the receiving means, transmitting means and capacitors into a semiconductor integrated circuit on a common substrate thereby reducing the size and weight of the telephone circuit.

Figure 4:
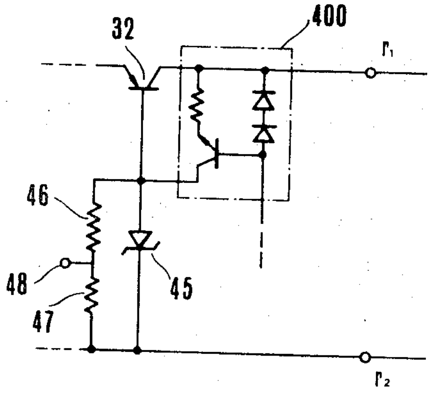

FIG. 4 illustrates a modified DC supply circuit. At present, since it is difficult to produce low voltage Zener diodes fabricated into a semiconductor integrated circuit, in this embodiment a single Zener diode 45 is provided for the constant current circuit 400 and a potentiometer consisting of resistors 46 and 47 is connected in parallel with Zener diode 45. The terminal 48 of the potentiometer is connected to resistor 36 shown in FIG. 3.

While the invention has been shown and described in terms of preferred embodiments thereof it should be understood that the invention is not limited to these particular embodiments and that many changes and modifications may be made without departing from the true spirit and scope of the invention as defined in the appended claims.

What is claimed is :

1. A telephone circuit comprising amplifier means constructed to produce a current which is proportional to the input voltage but not related to the load, a telephone line connected to the input terminals of said amplifier means, receiving means connected to the output terminals of said amplifier means, transmitting means connected across the input and output terminals of said amplifier means, a first variable impedance element connected in parallel with said receiving means, and a second variable impedance element connected in parallel with said transmitting means, said first and second variable impedance elements varying their impedances in accordance with the DC voltage condition of said telephone line.

2. The telephone circuit according to claim 1 wherein said amplifier means comprises a first transistor with its base and collector electrodes connected to the input terminals of said telephone line, a second transistor with its collector and base electrodes connected to the input terminals of said receiving means and a balancing network connected between the emitter electrodes of said first and second transistors, the collector electrode of said first transistor and the base electrode of said second transistor being interconnected.

3. The telephone circuit according to claim 1 which further includes a constant current circuit responsive to the DC voltage across said telephone line for supplying to said receiving means a constant DC bias current independent of the length of the telephone line.

4. The telephone circuit according to claim 1 which further includes a constant current circuit responsive to the DC voltage across said telephone line for supplying to said transmitter means a constant DC bias current independent of the length of said telephone line, and bias means biasing said constant current circuit for applying a constant voltage to said amplifier means.

5. The telephone circuit according to claim 1 wherein said first variable impedance element comprises a field effect transistor having a drain terminal and a source terminal which are connected across said transmitting means, and a gate terminal connected to means responsive to the DC voltage across said telephone line.

6. The telephone circuit according to claim 1 wherein said second variable impedance element comprises a field effect transistor having a drain terminal and a source terminal which are connected across said receiving means, and a gate electrode connected to means responsive to the DC voltage across said telephone line.

7. The telephone circuit according to claim 4 wherein said bias means includes at least one Zener diode connected to said constant current circuit.

8. The telephone circuit according to claim 5 wherein said means responsive to the DC voltage comprises a resistor connected across said telephone circuit.

9. A telephone circuit comprising an electromagnetic receiver having first and second terminals ; a source of DC current including a constant current circuit and two Zener diodes which are connected in series between said first and second terminals of said electromagnetic receiver; said constant current circuit including a diode with its cathode electrode connected to said first terminal of said electromagnetic receiver and a first transistor with its base electrode connected to the anode electrode of said diode, emitter electrode to the cathode electrode of said diode and collector electrode to the cathode electrode of a first one of said Zener diodes; a potentiometer resistor connected between the anode electrode of said diode and said second terminal of said receiver, said potentiometer resistor having an intermediate terminal ; amplifier means including a second transistor with its collector electrode connected to said first terminal of said receiver and the base electrode to the cathode electrode of said first Zener diode, a third transistor with its base electrode connected to the first terminal of a telephone line and collector electrode connected to the second terminal of said telephone line and to the second terminal of said receiver, and a balancing network connected between the emitter electrodes of said second and third transistors ; the base electrode of said third transistor being connected to the juncture between said two Zener diodes ; a transmitter connected between said first terminal of said receiver and said first terminal of said telephone line ; a first field effect transistor with its drain and source terminals connected across said transmitter ; and a second field effect transistor with its drain and source terminals connected across said receiver ; the gate electrodes of said first and second field effect transistors being connected to said intermediate terminal of said potentiometer resistor.

* * * * *

UNITED STATES PATENT OFFICE
CERTIFICATE OF CORRECTION

Patent No. 3,742,153 Dated June 26, 1973

Inventor(s) Ryoichi Matsuda, Masaaki Terai, Yasuo Hojyo

It is certified that error appears in the above-identified patent and that said Letters Patent are hereby corrected as shown below:

Column 1, line 16, correct "coventional" to -- conventional --.

Column 3, line 62, "$V_I$" should be -- $V_T$ --

Column 4, line 58, correct "voltaage" to -- voltage --.

Column 5, line 67, before "dependence" insert -- in --.

Signed and sealed this 10th day of September 1974.

(SEAL)
Attest:

McCOY M. GIBSON, JR.
Attesting Officer

C. MARSHALL DANN
Commissioner of Patents